US012598420B2

(12) United States Patent
Sullivan et al.

(10) Patent No.: US 12,598,420 B2
(45) Date of Patent: Apr. 7, 2026

(54) AUDIO DEVICE WITH ELECTROSTATIC DISCHARGE PROTECTION

(71) Applicant: Bose Corporation, Framingham, MA (US)

(72) Inventors: Donna Marie Sullivan, Millbury, MA (US); Thomas Aquinas Nilsen, Auburn, MA (US); James Joung-Mo Kang, Belmont, MA (US); Scott C. Perzanoski, Dudley, MA (US); Mark McCauley, Boston, MA (US); Richmond Andrew Real, Uxbridge, MA (US)

(73) Assignee: Bose Corporation, Framingham, MA (US)

( * ) Notice: Subject to any disclaimer, the term of this patent is extended or adjusted under 35 U.S.C. 154(b) by 182 days.

(21) Appl. No.: 18/284,588

(22) PCT Filed: Apr. 1, 2022

(86) PCT No.: PCT/US2022/023080
§ 371 (c)(1),
(2) Date: Sep. 28, 2023

(87) PCT Pub. No.: WO2022/216546
PCT Pub. Date: Oct. 13, 2022

(65) Prior Publication Data
US 2024/0179462 A1 May 30, 2024

Related U.S. Application Data

(60) Provisional application No. 63/171,134, filed on Apr. 6, 2021.

(51) Int. Cl.
*H04R 3/00* (2006.01)
*H04R 1/08* (2006.01)
*H04R 1/10* (2006.01)

(52) U.S. Cl.
CPC ............ *H04R 3/007* (2013.01); *H04R 1/086* (2013.01); *H04R 1/1016* (2013.01); *H04R 1/1075* (2013.01)

(58) Field of Classification Search
CPC ...... H04R 3/007; H04R 1/086; H04R 1/1016; H04R 1/1075
See application file for complete search history.

(56) References Cited

U.S. PATENT DOCUMENTS 5,825,606 A * 10/1998 Villain ................ H05K 9/0067 361/220
6,295,193 B1 * 9/2001 Mercke ................ H05K 9/0067 361/212

(Continued)

FOREIGN PATENT DOCUMENTS

CN 212115608 U 12/2020

OTHER PUBLICATIONS

PCT International Search Report and Written Opinion for International Application No. PCT/US2022/023080, dated Jul. 20, 2022, 14 pages.

*Primary Examiner* — Joseph Saunders, Jr.
(74) *Attorney, Agent, or Firm* — Hoffman Warnick LLC

(57) ABSTRACT

Various implementations include audio devices configured to mitigate electrostatic discharge (ESD) events, or strikes. In certain implementations, an audio device includes: a microphone mounted on a first side of a printed wiring board (PWB); and an electrostatic discharge (ESD) protection element coupled to a second side of the PWB directly opposite the microphone, wherein the ESD protection element is positioned to divert an ESD strike away from the microphone.

21 Claims, 11 Drawing Sheets

(56) References Cited

U.S. PATENT DOCUMENTS

| | | | | |
|---|---|---|---|---|
| 6,493,198 | B1 * | 12/2002 | Arledge .................... | H01T 4/10 361/111 |
| 11,310,581 | B1 * | 4/2022 | Shanmugam ............ | H01Q 9/40 |
| 2012/0027241 | A1 | 2/2012 | Turnbull et al. | |
| 2014/0355812 | A1 * | 12/2014 | Tossavainen .......... | H04R 3/007 381/395 |
| 2018/0098143 | A1 | 4/2018 | Silvestri et al. | |
| 2020/0169799 | A1 | 5/2020 | Schuler et al. | |
| 2021/0089130 | A1 * | 3/2021 | Novich ................... | G06F 3/014 |
| 2021/0410340 | A1 * | 12/2021 | Meeusen .................. | H04R 1/04 |

* cited by examiner

AUDIO DEVICE WITH ELECTROSTATIC DISCHARGE PROTECTION

PRIORITY CLAIM

This application claims priority to U.S. Provisional Patent Application No. 63/171,134 filed on Apr. 6, 2021, which is incorporated by reference in its entirety.

TECHNICAL FIELD

This disclosure generally relates to audio devices. More particularly, the disclosure relates to protecting microphones in audio devices from electrostatic discharge.

BACKGROUND

Consumer electronic devices, including audio devices, are sometimes subject to electrostatic discharge (ESD), most familiar as a static shock experienced when touching something after walking on carpet. When the discharge is into electronic components, they can be damaged.

SUMMARY

All examples and features mentioned below can be combined in any technically possible way.

Various implementations include audio devices configured to mitigate electrostatic discharge (ESD) events, or strikes. In certain implementations, an audio device includes: a microphone mounted on a first side of a printed wiring board (PWB); and an electrostatic discharge (ESD) protection element coupled to a second side of the PWB directly opposite the microphone. In some cases, the ESD protection element is positioned to divert an ESD strike away from the microphone.

In some particular aspects, an audio device includes: a microphone mounted on a first side of a printed wiring board (PWB); and an electrostatic discharge (ESD) protection element coupled to a second side of the PWB directly opposite the microphone, where the ESD protection element is positioned to divert an ESD strike away from the microphone.

Implementations may include one of the following features, or any combination thereof.

In certain implementations, the PWB includes a port allowing acoustic energy to pass therethrough for detection by the microphone.

In some cases, the audio device further includes a stiffener directly coupled with the second side of the PWB, the stiffener having an opening that is coaxial with the port.

In particular aspects, the ESD protection element is coupled with the stiffener on a side opposite the PWB and includes an electrically conductive mesh overlying the opening in the stiffener.

In particular aspects, the electrically conductive mesh has a low acoustic resistance. In additional aspects, the electrically conductive mesh is coated (e.g., with PVD for color, hydrophobic coatings for water resistance, oleophobic coatings for oil resistance, etc.).

In some cases, the electrically conductive mesh includes a metal.

In certain implementations, the stiffener is electrically insulating and includes a slot exposing a portion of the PWB, and the ESD protection element includes a tab extending from the electrically conductive mesh to contact the exposed portion of the PWB.

In some cases, the tab includes any electrical contact between the electrically conductive mesh and the exposed portion of the PWB, e.g., a metal tab, a via, a solder element, etc.

In particular aspects, the slot in the stiffener and the opening in the stiffener are separated by at least a minimum spacing to divert the ESD strike away from the microphone.

In some cases, the audio device further includes an adhesive coupling the ESD protection element to the stiffener.

In some cases, the adhesive is located on both sides (e.g., top and bottom) of the electrically conductive mesh. In other cases, the adhesive is only located on one side of the electrically conductive mesh. In further cases, the adhesive includes a pressure sensitive adhesive (PSA). In further cases, the adhesive is applied around an entire annulus of the opening. In some cases, the adhesive is electrically conductive; in other cases, the adhesive is electrically non-conductive.

In particular implementations, the electrically conductive mesh is electrically coupled with the PWB through the stiffener.

In certain aspects, the stiffener is electrically conductive and enables the electrical coupling between the electrically conductive mesh and the PWB.

In some cases, the audio device further includes a stiffener directly coupled with the second side of the PWB, where the PWB includes a port allowing acoustic energy to pass therethrough for detection by the microphone, and the stiffener has an opening aligned with the port in the PWB, where the opening includes the ESD protection element and includes a non-uniform radial dimension relative to a central axis of port.

In particular implementations, the non-uniform radial dimension is characterized by a jagged profile.

In certain aspects, the opening in the stiffener has an inner radial dimension at all locations that is greater than an inner radial dimension of the port in the PWB.

In some implementations, the stiffener is electrically conductive.

In particular cases, the audio device further includes a mesh overlying the opening in the stiffener, the mesh having a low acoustic resistance.

In some implementations, the audio device further includes a stiffener directly coupled with the second side of the PWB, where the PWB includes a port allowing acoustic energy to pass therethrough for detection by the microphone, the stiffener has an opening aligned with the port in the PWB, and the ESD protection element includes a lip extending around the opening in the stiffener.

In certain aspects, the audio device further includes a mesh overlying the opening in the stiffener, the mesh having a low acoustic resistance.

In particular cases, the lip protrudes from the stiffener in a direction away from the microphone.

In some implementations, the lip protrudes from a rear surface of the stiffener by approximately 0.1 millimeters (mm) to approximately 1.0 mm. In particular cases, the lip protrudes from the rear surface of the stiffener by approximately 0.2 mm, or approximately 0.3 mm.

In some aspects, the audio device includes an earbud.

In certain implementations, the PWB includes a flexible printed circuit (FPC).

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
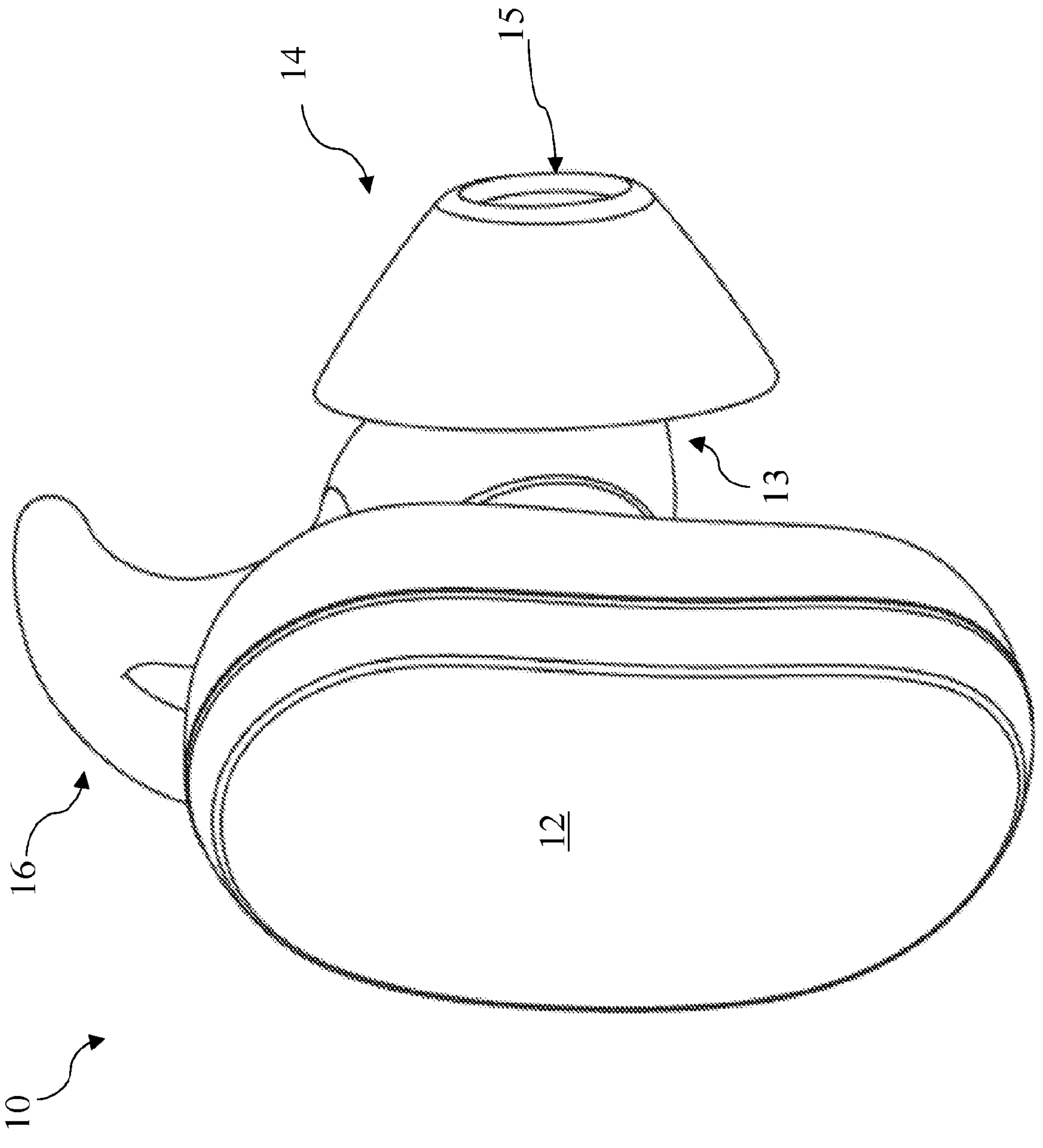
FIG. 1 is an isometric view of an audio device according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to audio devices such as speakers, as well as wearable audio devices such as earphones (e.g., earbuds) or audio eyeglasses. More particularly, aspects of the disclosure relate to audio devices having an electrostatic discharge (ESD) protection element that is positioned to divert an ESD strike away from a device microphone.

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term “approximately” is used to modify values, and in these cases, can refer to that value+/−a margin of error, such as a measurement error. It is understood that the terms “inboard” and “outboard” are used to describe the radial location of components relative to a central axis (A), such that relative to the axis (A), a component that is radially inboard of a distinct component is closer to the central axis (A) on a radial (perpendicular) line that extends from the axis (A). The term “radially oriented” can be used to refer to a component, line, or plane that is perpendicular to an axis such as a central axis (A).

Components shown and described herein can be formed according to various manufacturing techniques, for example, molding, casting, additive manufacturing (e.g., 3D printing), etc. Where specific techniques are not described, conventional manufacturing approaches can be used to form the components and structures disclosed according to various implementations.

Note that in the drawings and the following description, non-limiting values of some variables are used. These values represent specific non-limiting examples, it being understood that the disclosure is in no way limited by these examples.

Aspects and implementations disclosed herein may be applicable to a wide variety of speaker systems, such as portable and/or fixed speaker systems, and wearable audio devices in various form factors. Certain implementations have particular application to earphones (e.g., earbuds), audio eyeglasses or other head-mounted audio devices. Unless specified otherwise, the term wearable audio device, as used in this document, includes headphones and various other types of personal audio devices such as head, shoulder or body-worn acoustic devices that include one or more acoustic drivers to produce sound, with or without contacting the ears of a user. Some aspects disclosed may be particularly applicable to personal (wearable) audio devices such as in-ear earphones (also called, earbuds) and audio eyeglasses. It should be noted that although specific implementations of speaker systems primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to speaker systems that either do or do not support two-way communications, and either do or do not support active noise reduction (ANR). For speaker systems that do support either two-way communications or ANR, it is intended that what is disclosed and claimed herein is applicable to a speaker system incorporating one or more microphones disposed on a portion of the speaker system that remains outside an ear when in use (e.g., feedforward microphones), on a portion that is inserted into a portion of an ear when in use (e.g., feedback microphones), or disposed on both of such portions. Still other implementations of speaker systems to which what is disclosed and what is claimed herein is applicable will be apparent to those skilled in the art.

The wearable audio devices disclosed herein can include additional features and capabilities not explicitly described. That is, the wearable audio devices described according to various implementations can include features found in one or more other wearable electronic devices, such as smart glasses, smart watches, etc., or any other wearable audio device. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

As described herein, audio devices (e.g., small-scale wearable audio devices) are sometimes subject to electrostatic discharge (ESD). In particular cases, ESD events, or “strikes” can impact microphones and related components in audio devices, severely damaging those components. In contrast to conventional audio devices, various implementations include audio devices with a microphone mounted on a first side of a printed wiring board (PWB), and an ESD protection element coupled to a second side of the PWB directly opposite the microphone. In these cases, the ESD protection element is positioned to divert an ESD strike away from the microphone.

FIG. 1 is an isometric view of an example audio device 10, which can include a wearable audio device, according to various implementations. In the example depicted in FIG. 1, the audio device 10 is an in-ear headphone, earphone, or earbud. Various additional features of earphones and earbuds are disclosed in U.S. Pat. Nos. 10,021,470; 9,854,345; and 8,989,427, the disclosures of which are incorporated herein by reference in their entirety and for all purposes. As such, certain details of the audio device 10 are not further described herein. While FIG. 1 depicts an example audio device 10 (e.g., an earphone, or earbud) according to this disclosure, this and the other FIGURES are not limiting of the scope, as earphones can also be located on or over the ear, or even on the head near the ear (also referred to as "near-ear"). Additionally, wearable audio devices in various form factors can utilize aspects of the implementations disclosed herein. Even further, audio devices such as speakers can utilize aspects of the implementations disclosed herein. That is, although shown in the context of headphones, any device with a microphone enclosed in a casing may be subject of such damage.

As noted, in the example depicted in FIG. 1, the audio device 10 is an in-ear headphone, earphone, or earbud. As shown in this (earbud) example, the audio device 10 includes a body 12 that houses the active components of the earbud. An ear tip portion 14 is coupled to body 12 and is pliable so that it can be inserted into at least the entrance of the user's ear canal. Sound is delivered through opening 15. In some example cases, a nozzle 13 spans between the body 12 and the opening 15. In optional cases, retaining loop 16 is constructed and arranged to be positioned in the outer ear, for example in the antihelix, to help retain the earbud in the ear. However, other variations on the retaining loop 16, or other retaining structures, are also possible in accordance with the implementations. For example, a retaining structure can be positioned to rest on or over a portion of the user's ear. In additional cases, the body 12 can be shaped to sit proximate the entrance of the user's ear canal without an additional retaining structure. In still further cases, a retaining structure can be positioned, along with the body 12, to provide a fulcrum or support against a portion of the user's ear. In additional cases, a separate retaining structure can be present to retain the ear tip portion 14 proximate the user's ear canal, e.g., a retaining structure that is separate from an ear tip portion.

Figure 2:
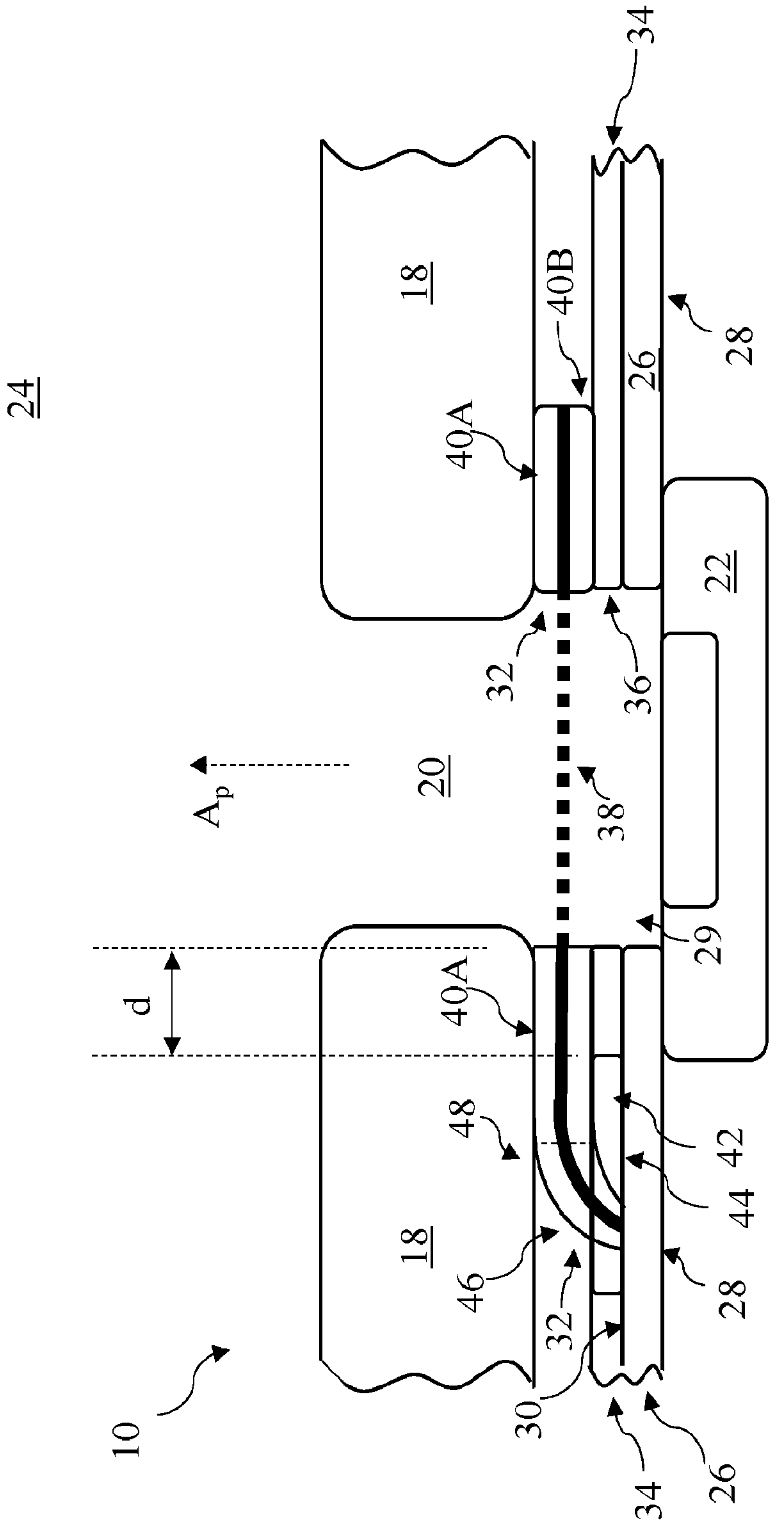
FIG. 2 is a cross-sectional depiction of a portion of the audio device of FIG. 1.

FIG. 2 shows certain internal components of the audio device 10 to illustrate various aspects of the disclosure. In these cases, the audio device 10 includes a frame 18 with at least one microphone opening (or port) 20. In some cases, the frame 18 includes an outermost wall of the audio device 10. In additional cases, the frame 18 can be covered by a shell material and/or coating (not shown). In various implementations, the microphone port 20, and areas proximate the port 20 are capable of building up an electrostatic charge. It is understood that the audio device 10 can include a plurality of microphone ports 20 (in frame 18) that enable a microphone 22 to detect acoustic signals from the ambient environment. For example, where the audio device 10 is an ANR audio device (e.g., ANR headphone or earpiece), at least two microphones 22 (e.g., feedforward and feedback) are present to enable ANR functionality. In any case, the microphone port 20 can allow acoustic energy (e.g., from ambient environment 24) to pass therethrough for detection by the microphone 22. In some examples, the microphone(s) described herein include micro-electrical mechanical system (MEMS) microphones, as are known in the art. Other microphone technologies could also be used. Microphone 22 is illustrated including a housing and an opening for detecting acoustic energy via the port 20. Internal components in the microphone 22 are not shown.

In audio device 10, as in conventional audio devices, electrostatic charge that accumulates around the outer portion of the frame 18 (e.g., at or near the port 20) is prone to discharge at nearby conductive components. Certain implementations (not shown) can include a grille at or near the outer portion of the frame 18 over the port 20, which may also accumulate electrostatic charge. In certain conventional audio devices, electrostatic charge that accumulates near the port 20 is prone to discharge via the metal components in the microphone 22, which may be the nearest conductive components in the audio device 10. As described herein, the audio device 10 includes an ESD protection element to mitigate electrostatic discharge (also called an ESD strike) to the microphone 22 and its nearby acoustic and electronic components.

Figure 3:
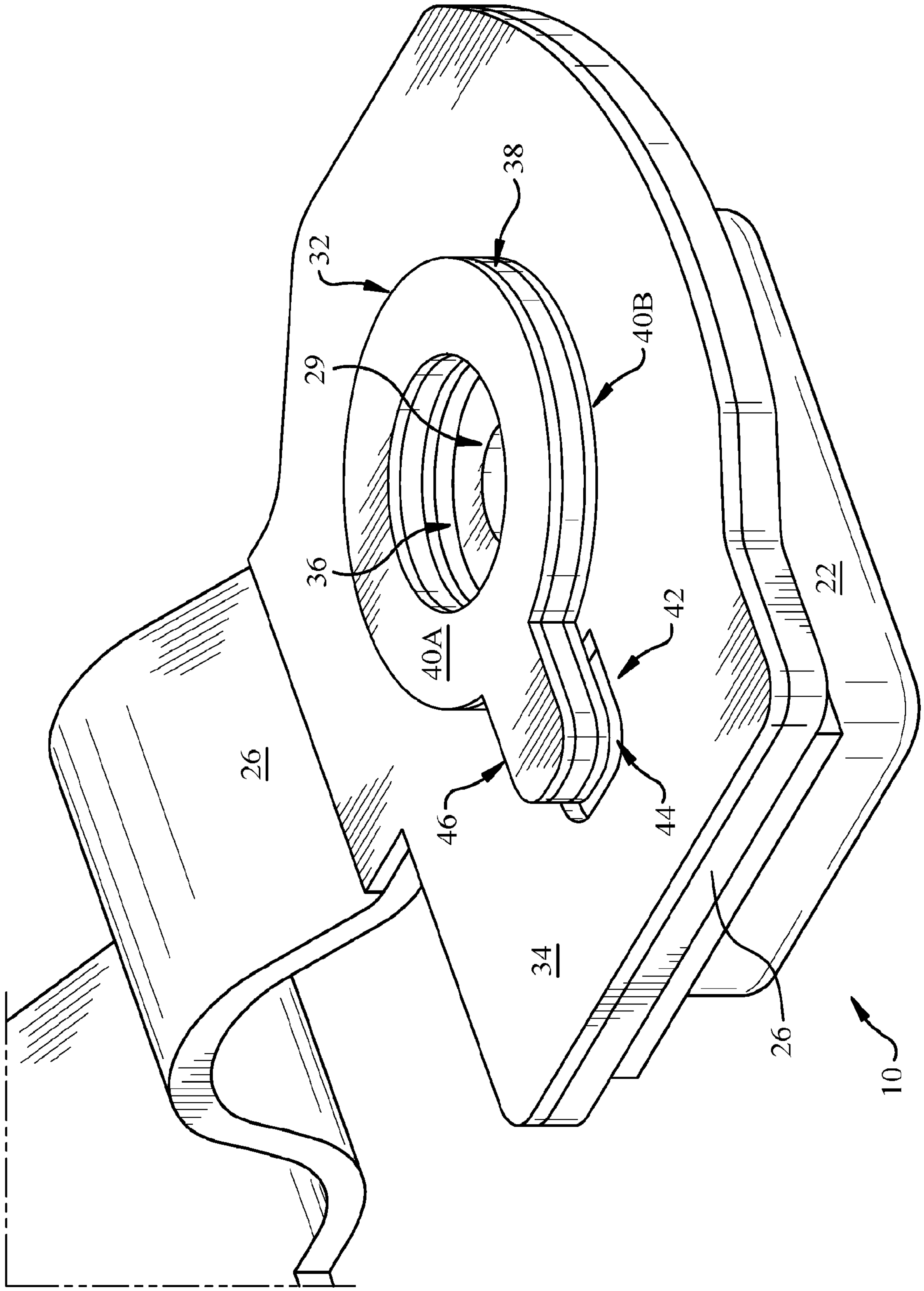
FIG. 3 is a perspective view of portions of the audio device in FIGS. 1 and 2.

FIG. 3 shows certain implementations of the audio device 10 from FIG. 2 in a partial perspective view. FIG. 2 and FIG. 3 are referred to simultaneously. In some implementations, the audio device 10 includes a printed wiring board PWB 26, and the microphone 22 is mounted on a first side 28 of the PWB 26. In some cases, the PWB 26 includes a printed circuit board (PCB), such as a flexible printed circuit (FPC). In certain additional cases, at least a portion of the PWB 26 is substantially rigid, or semi-rigid. Wire leads (not shown) can connect the PWB 26 to contacts in the microphone 22. Additional connections may exist between the PWB 26, one or more speakers, additional microphone(s) and another PWB such as a PCB (not shown), which may be located in another section of the frame 18. Other electronic components, such as sensors or buttons may also be included and connected to the PWB 26 or to additional PWBs 26. The PWB 26 is shown including a slot 29 enabling acoustic access to the underlying microphone 22.

Also shown in FIG. 2 and FIG. 3, coupled to a second side 30 of the PWB 26 is an electrostatic discharge (ESD) protection element 32. In various implementations, the second side 30 of the PWB 26 is directly opposite the first side 28. As described herein, the ESD protection element 32 is positioned to divert an ESD strike away from the microphone 22. In certain implementations, such as illustrated in FIG. 2 and FIG. 3, the audio device 10 can further include a stiffener 34 directly coupled with the second side 30 of the PWB 26. In these cases, the stiffener 34 can include an opening 36 that is coaxial with the port 20. In some cases, the stiffener 34 is formed of: stainless steel, a glass-reinforced epoxy laminate material (e.g., FR-4), polyimide, and/or a rigid section of a rigid-flex PWB. In particular implementations, the stiffener 34 directly contacts the second side 30 of the PWB 26, and is interposed between the PWB 26 and the ESD protection element 32. In certain of these cases, the ESD protection element 32 is coupled with the stiffener 34 on a side opposite the PWB 26. In some optional implementations, the ESD protection element 32 includes an electrically conductive mesh 38, which in certain cases, overlies the opening 36 in the stiffener 34 (illustrated in phantom in FIG. 2). According to certain implementations, the mesh 38 includes a metal, however, the electrically conductive mesh 38 can include other electrically conductive materials. In various example implementations, the mesh 38 has a Rayl value of approximately 400 to approximately 600. In some implementations, distinct mesh can be used to cover distinct microphone ports, and can have distinct Rayl values, which can vary based on the size of the ported acoustic volume and/or the size of the microphone(s). In a particular group of non-limiting examples, one or more ports is covered with a mesh (e.g. metal mesh) having a Rayl value of approximately 400 to approximately 600 (e.g., GBOPP AM 500, AM 460, AM 420, or AM 400). In various implementations, e.g., where the mesh 38 is metal, that mesh 38 is made of steel such as stainless steel. According to some implementations, the mesh 38 includes GBOPP AM 500 or a similar mesh material. In particular cases, the mesh is coated, e.g., with a thin PVD coating, e.g. for color. In additional implementations, the coating is hydrophobic, e.g., to prevent water ingress, or is oleophobic, e.g., for oil resistance. In certain implementations, one or more meshes in the device has a low acoustic resistance, meaning that it has negligible impact on the detection of acoustic energy by the microphone 22. In additional implementations, any mesh described herein (e.g., mesh 38) can be supplemented or substituted with a conductive membrane, e.g., with a similar acoustic transparency.

The ESD protection element 32 can be coupled with the stiffener 34, e.g., by an adhesive 40, such that the adhesive 40 is present on one or more sides of the electrically conductive mesh 38. In some cases, distinct adhesives (labeled 40A, 40B) are present on distinct sides of the mesh 38. While FIG. 3 illustrates adhesive 40A above mesh 38 and adhesive 40B below the mesh 38, it is understood that in certain implementations, only the adhesive 40B is present to couple the lower surface of the mesh 38 with the stiffener 34. In additional cases, the adhesive 40B may be present around the entirety of the opening 36 in the stiffener 34, and in some cases, one or both adhesives 40A, 40B are only present around the opening 36, e.g., on one or both sides of the stiffener 34. In additional implementations, the adhesive 40B is present proximate the opening 36, as well as a separate slot (e.g., slot 42) in the stiffener 34, which can be distinct (separate) openings through the stiffener 34. In some aspects, the adhesive 40 includes a pressure sensitive adhesive (PSA), which in particular cases, is electrically conductive. In various additional aspects, the adhesive 40 is electrically conductive, and in other aspects, is electrically non-conductive (e.g., insulating). In still further implementations, adhesive 40A can differ in type from adhesive 40B.

According to various implementations, as illustrated in the examples depicted in FIGS. 2 and 3, the stiffener 34 is electrically insulating, and includes a slot 42 exposing a portion 44 of the (underlying) PWB 26. In these cases, the ESD protection element 32 includes a tab 46 extending from the electrically conductive mesh 38 to contact the exposed portion 44 of the PWB 26. In particular cases, the tab 46 includes any electrical contact between the ESD protection element 32 and the PWB 26. For example, the tab 46 can include an extension of the mesh 38 in some cases. In additional implementations, the tab 46 can include a solder or via contact with the PWB 26. In further cases, the ESD protection element 32 can include a bend or contour 48 for contacting the exposed portion 44 of the PWB 26. According to some implementations, the slot 42 in the stiffener 34 and the opening 36 in the stiffener are separated by a minimum spacing (d) to divert an ESD strike away from the microphone.

In some additional cases, the electrically conductive mesh 38 is electrically coupled with the PWB 26 through the stiffener 34. For example, the stiffener 34 can be electrically conductive (e.g., including a metal and/or an electrically conductive polymer) and enable the electrical coupling between the mesh 38 and the PWB 26. These cases may not include the slot 42 in the stiffener, and may incorporate an additional insulating material interposed between the stiffener 34 and the PWB 26, or may incorporate a stiffener with a different size and/or shape than depicted in the examples in FIGS. 2 and 3. In any case, the ESD protection element 32 is positioned to attract or otherwise divert an ESD strike away from the microphone 22 and/or other proximate electronics in the audio device 10.

Figure 4:
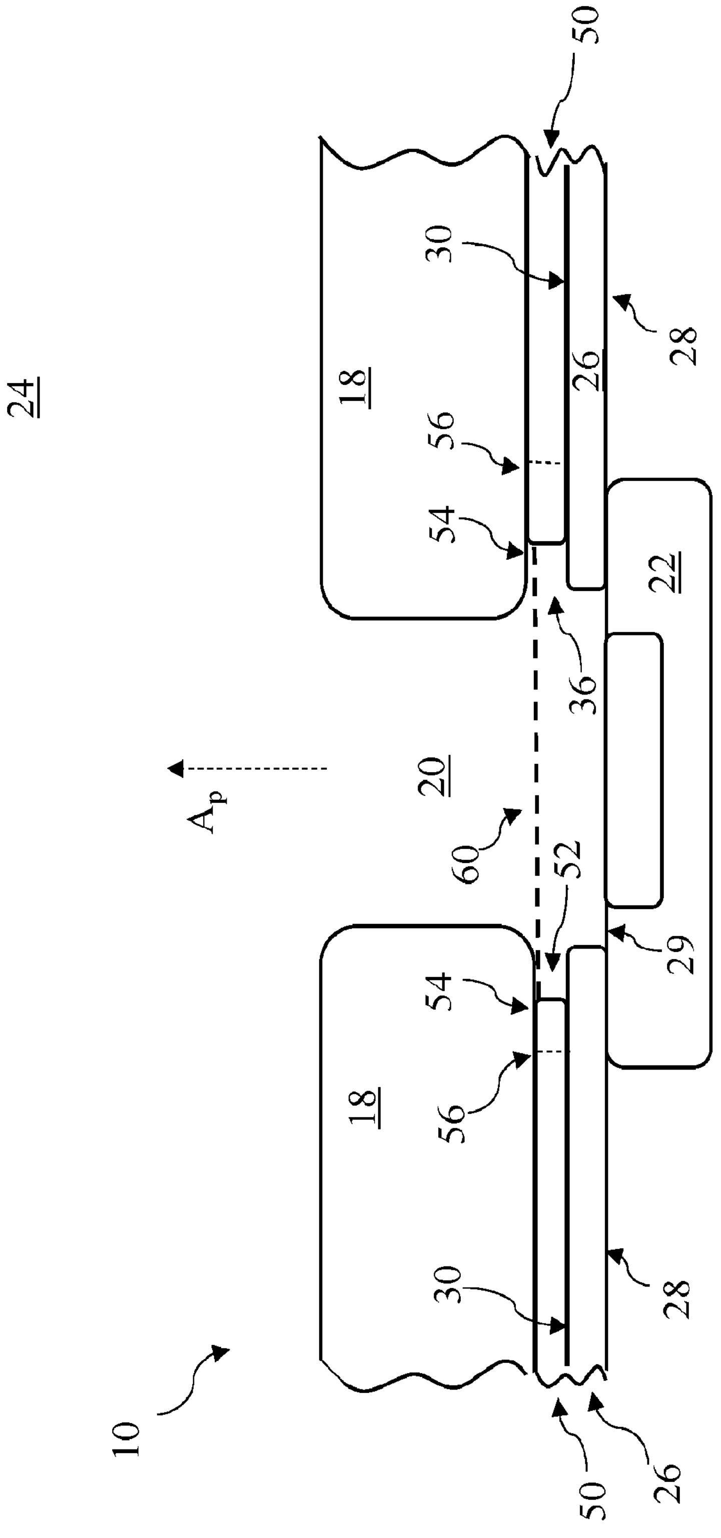
FIG. 4 is a cross-sectional depiction of a portion of an audio device according to various further implementations.
Figure 5:
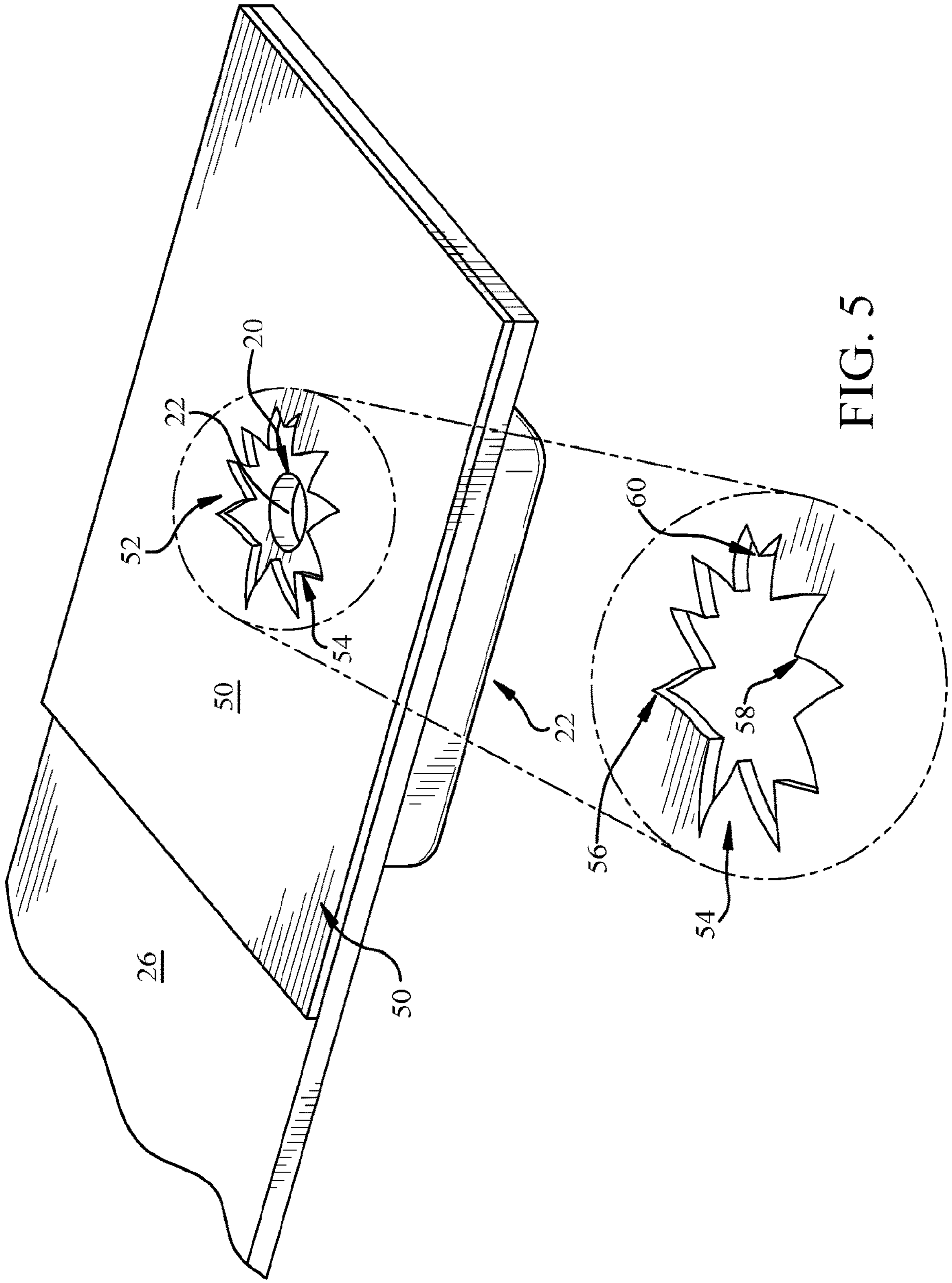
FIG. 5 is a perspective view of portions of the audio device in FIG. 4.

In certain additional implementations, for example as illustrated in FIGS. 4 and 5, another implementation of the audio device 10 can include a stiffener 50 that is directly coupled with the second side 30 of the PWB 26. According to some implementations, stiffener 50 is electrically conductive, e.g., formed of a metal and/or an electrically conductive polymer. In some cases, the stiffener 50 includes an opening 52 that is aligned with the slot 29 in the PWB 26. According to certain implementations, the opening 52 includes an ESD protection element 54 and has a non-uniform radial dimension relative to the central axis (Ap) of the port 20 in the housing 18.

FIG. 5 includes a close-up depiction of the ESD protection element 54 having a non-uniform radial dimension relative to the central axis (Ap) of the port 20 (FIG. 4). In certain of these cases, the ESD protection element 54 is characterized by a jagged profile. In other terms, at least one portion 56 of the profile around the opening 52 is located at a distinct distance from the central axis ($A_p$) than another portion 58 of the profile around the opening 52, e.g., forming a star shape. In certain cases, the jagged profile is characterized by at least one edge or point, several of which are illustrated in FIG. 5. In more particular cases, the non-uniform radial dimension includes three or more portions that are located at three or more distinct (radial) distances from the central axis ($A_p$), e.g., portion 56 at a first distance, portion 58 at a second distance, and portion 60 at a third distance. In certain implementations, regardless of the profile or shape, the inner radial dimension of the opening 52 (as measured from central axis $A_p$) is greater, at all locations, than an inner radial dimension of the port 20 in the housing 18. In this sense, the ESD protection element 54 does not interfere with the acoustic aspects of the port 20 and the microphone 22. In any case, the ESD protection element 54 is positioned to attract or otherwise divert an ESD strike away from the microphone 22 and/or other proximate electronics in the audio device 10.

As illustrated in FIG. 4, in some cases, the stiffener 50 can also include a mesh 60 overlying the opening 52 in the stiffener 50. In various implementations, the mesh 60 has a low acoustic resistance (e.g., similar to mesh 38 (FIG. 2). However, in other implementations, a mesh 60 is not present.

Figure 6:
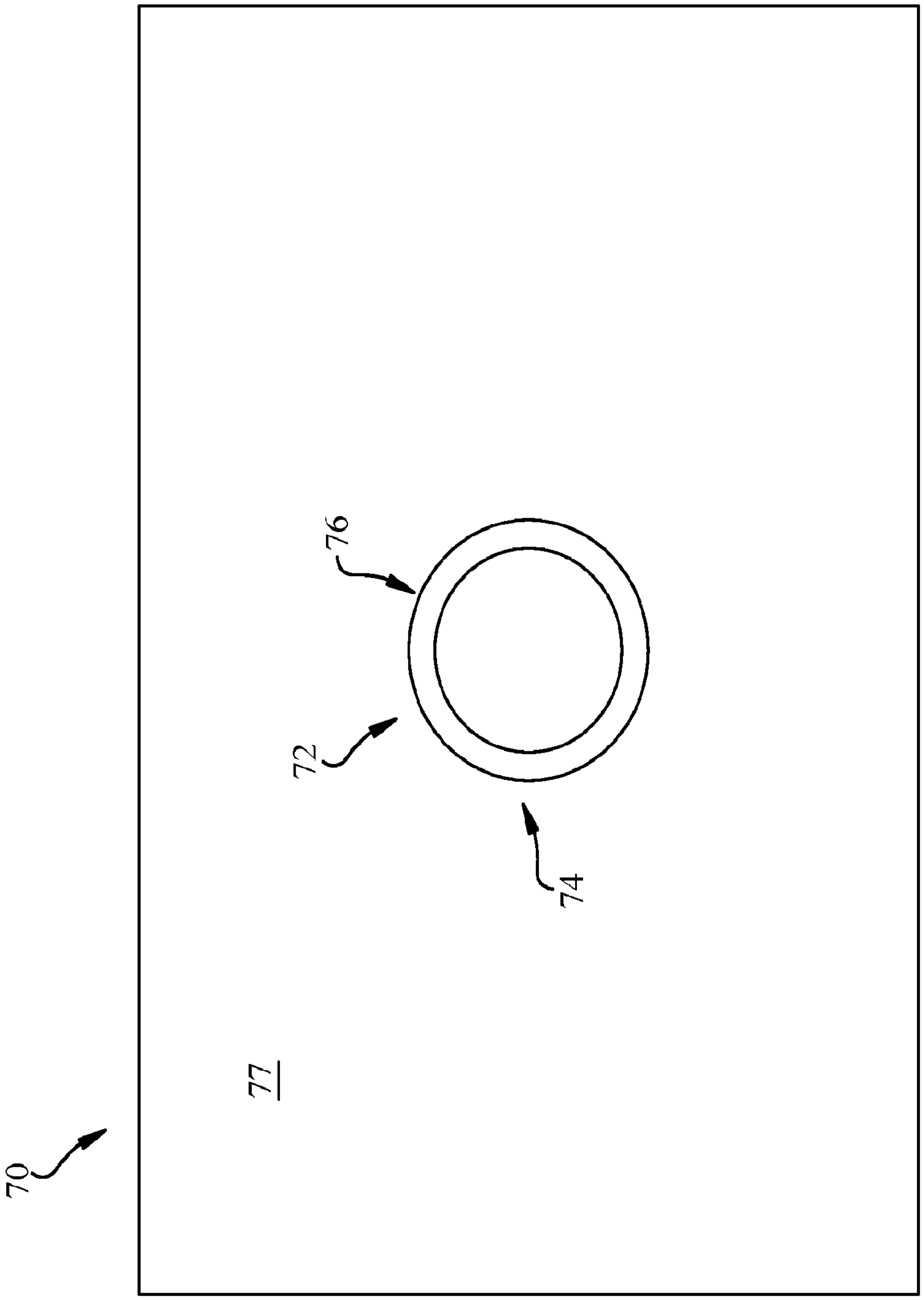
FIG. 6 is a top view of a portion of an audio device according to various additional implementations.
Figure 7:
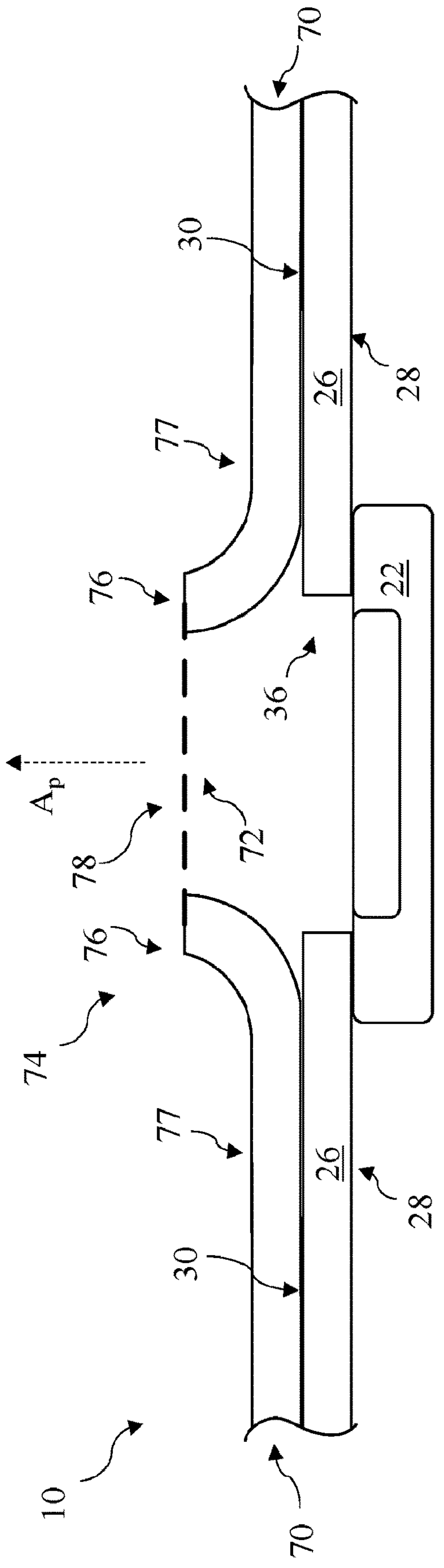
FIG. 7 is a cross-sectional depiction of the portion of the audio device in FIG. 6.

In still further implementations, e.g., as illustrated in FIG. 6 and FIG. 7, another implementation of the audio device 10 can include a stiffener 70 that is directly coupled with the second side 30 of the PWB 26 (FIG. 7). In these cases, the stiffener 70 has an opening 72 that is aligned with the port 20 in the housing 18, and an ESD protection element 74 that includes a lip 76 extending around the opening 72 in the stiffener 70. In certain implementations, the lip 76 protrudes from the stiffener 70, e.g., the rear (or, outer) surface 77 of the stiffener 26, in a direction away from the microphone 22. According to various aspects, the lip 76 protrudes from the surface 77 by approximately 0.1 millimeters (mm) to approximately 1.0 mm, and in more particular cases, approximately 0.2 mm or approximately 0.3 mm. In particular implementations, the lip 76 can have a substantially uniform, or smooth radially facing inner surface relative to the central axis ($A_p$). For example, the lip 76 can take the shape of a castellated volcano, or a symmetrical ridge. In other cases, the inner surface of any portion of the lip 76 can have a non-uniform radial profile (e.g., jagged, curved, bent, etc.) similar to ESD protection element 54 shown and described with reference to FIGS. 4 and 5.

In still further implementations, the lip 76 can be replaced with one or more axially extending bumps, ridges or other protrusions that are arranged circumferentially about the opening 72 in the stiffener 70. That is, in place of a continuous lip, a plurality of separate or separated bumps, ridges or other protrusions can be arranged circumferentially about the opening 72 in the stiffener. In any case, the lip 76, bumps, ridges, or other protrusions do not extend axially into the port (opening) 20 in the housing 18. In the axial direction of the port 20 ($A_p$), the lip 76, bumps, ridges, and/or other protrusions can extend up to, but not past, the inner surface of the frame 18. That is, the lip 76 (or bumps, ridges, protrusions, etc.) do not interfere with the acoustic channel created by the port 20.

In some aspects, a mesh 78 is positioned over the opening 72 in the stiffener 70, e.g., a mesh with a low acoustic resistance such as those meshes shown and described with respect to other implementations. However, in other implementations, a mesh 78 is not present.

In further variations on the features shown and described with reference to FIGS. 4-7, the stiffener(s) can be integrated into the PWB. That is, the PWB can include a PCB with at least a partially rigid section overlying the microphone 22. In these cases, the partially rigid section of the PCB can include the ESD protection element 54 and/or the ESD protection element 74 shown and described with reference to FIGS. 4-7. In some of these cases, the partially rigid section of the PCB can include polyimide.

It is additionally understood that the audio devices disclosed according to various implementations can include a counter-bore feature for coupling the mesh to the device frame (or, housing). In various implementations, that frame is made of a plastic or a composite material. Additional features of counter-bore mesh couplings are disclosed in U.S. patent application Ser. No. 16/828,327 (filed on Mar. 24, 2020), which is incorporated by reference in its entirety.

Figure 8:
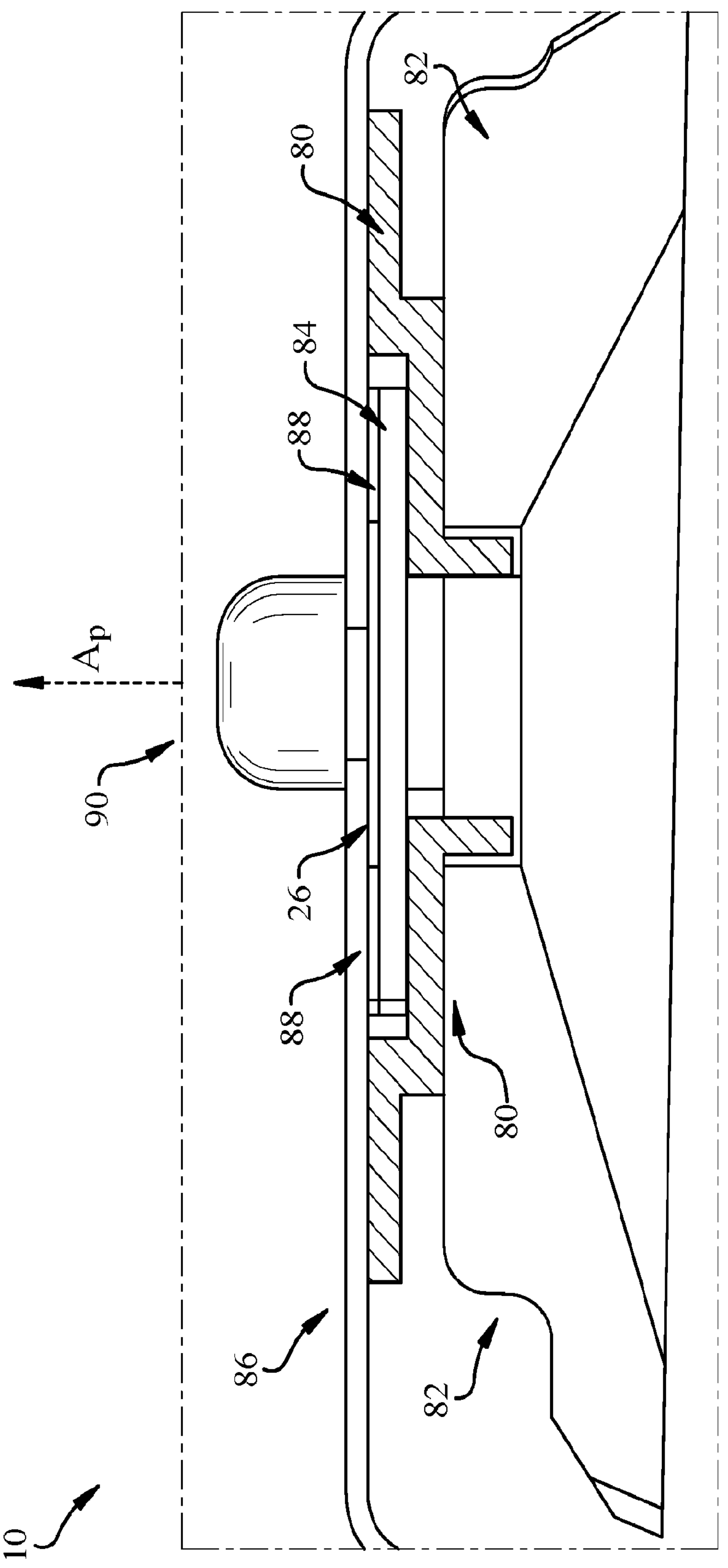
FIG. 8 is a cross-sectional depiction of a portion of an audio device according to various additional implementations.

FIG. 8 is a partial cross-sectional depiction of an additional implementation of an audio device 10, according to various implementations. In these implementations, a stiffener 80 is positioned over a microphone housing 82 (e.g., similar to microphone 22 in FIGS. 2-4 and 7), with a mesh 84 overlying the stiffener 80. In certain cases, the mesh 84 is coupled to the wall of the device housing 86 by an adhesive 88 (e.g., PSA and/or other adhesives described herein). According to some implementations, the PWB 26 (e.g., an FPC) overlies the mesh 84, and is at least partially surrounded by the adhesive 88, such that the PWB 26 is interposed between the mesh 84 and the wall of the device housing 86 (e.g., audio device housing). It is understood that the PWB 26 can include an internal opening (axially aligned with $A_p$) enabling acoustic energy entering the port 90 to be detected by the microphone in housing 82. Additionally, in some cases, the mesh 84 includes a slot or opening that is coaxial with the primary axis ($A_p$) of port 90. In various implementations, the stiffener 80 is mounted to the housing 86 and/or the mesh 84. In certain examples, the stiffener 80 extends axially between the microphone housing 82 and the device housing 86. In particular examples, the stiffener 80 surrounds, or at least partially surrounds (circumferentially) the mesh 84 and the PWB 26. The stiffener 80 may have one or more internal contours or edges to envelop the mesh 84 and the PWB 26, and in some cases, provides at least some structural support for those components. In particular cases, the PWB 26 is surrounded, or at least partially surrounded (circumferentially) by the adhesive 88. In various implementations, the mesh 84 is positioned to divert an ESD strike away from the underlying microphone in housing 82.

Figure 9:
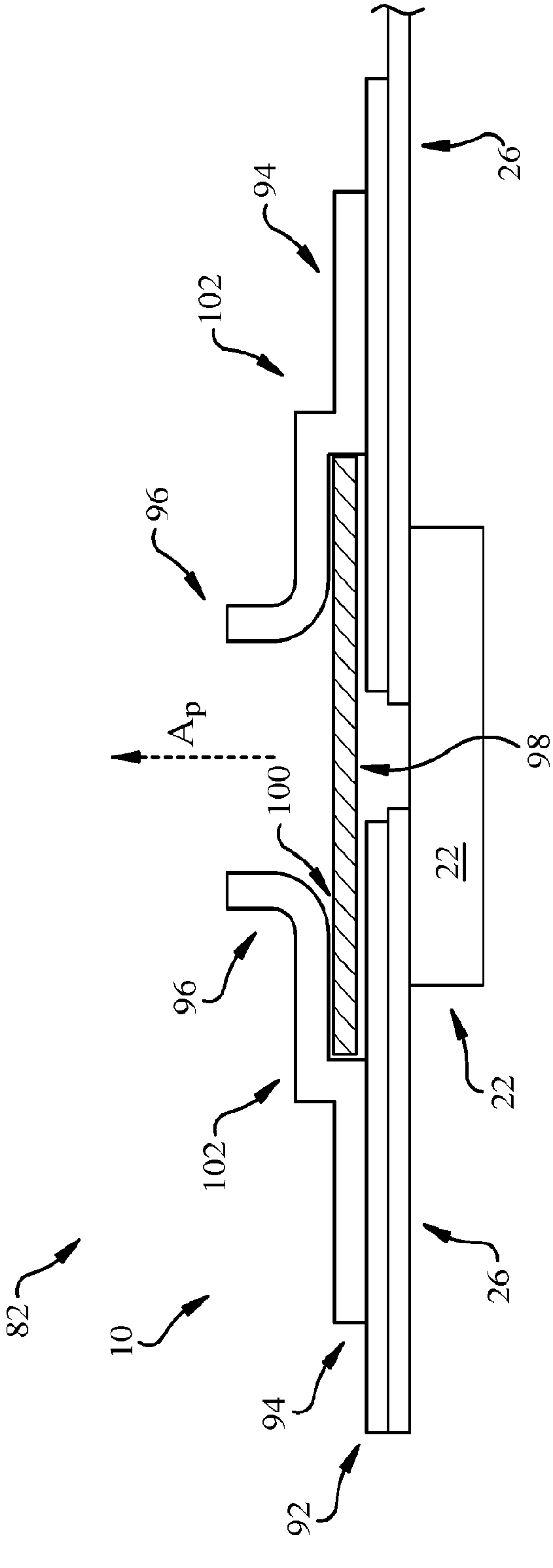
FIG. 9 is a cross-sectional depiction of a portion of an audio device according to various further implementations.

FIG. 9 is a partial cross-sectional depiction of an additional implementation of an audio device 10, according to various implementations. In these implementations, a multi-part stiffener is positioned over the microphone 22 and PWB 26 (e.g., an FPC), which can act as an ESD protection element. In particular examples, a first stiffener 92 (e.g., a flat stiffener) is positioned over the PWB 26 (e.g., mounted or otherwise coupled or adhered to PWB 26), and a second stiffener 94 (e.g., a contoured or otherwise non-flat stiffener) is positioned over the first stiffener 92 (e.g., coupled via any approach described herein). In certain cases, one or both stiffeners 92, 94 includes an ESD protection element 96 for diverting an ESD strike away from the underlying microphone 22. In the example depicted in FIG. 9, the second stiffener 94 includes the ESD protection element 96. In certain cases, the ESD protection element 96 can resemble ESD protection element 74 in FIG. 7, and can be shaped similarly to lip 76. However, any variation of the lip 76 described with reference to FIGS. 6 and 7 can also be implemented in the ESD protection element 96 in FIG. 9. For example, one or more ridges, protrusions, bumps, etc., can be formed in the second stiffener 94 to function as ESD protection element 96. A mesh 98 (and/or other conductive membrane described herein) is positioned within an gap 100 in the second stiffener 94. In certain implementations, the mesh 98 is positioned within a radial portion of the gap between sections of the second stiffener 94, e.g., within a space defined by one or more contours 102 in the second stiffener 94. Additionally, in particular cases, the mesh 98 is positioned within an axial gap between the first stiffener 92 and the second stiffener 94. Mesh 98 can be similar to any other mesh material described herein, e.g., having a Rayl value of approximately 400 or greater. In these implementations, the multi-part stiffener 92, 94 can be formed more efficiently, and/or with lower cost, than a more complicated and/or unitary stiffener shape.

Figure 10:
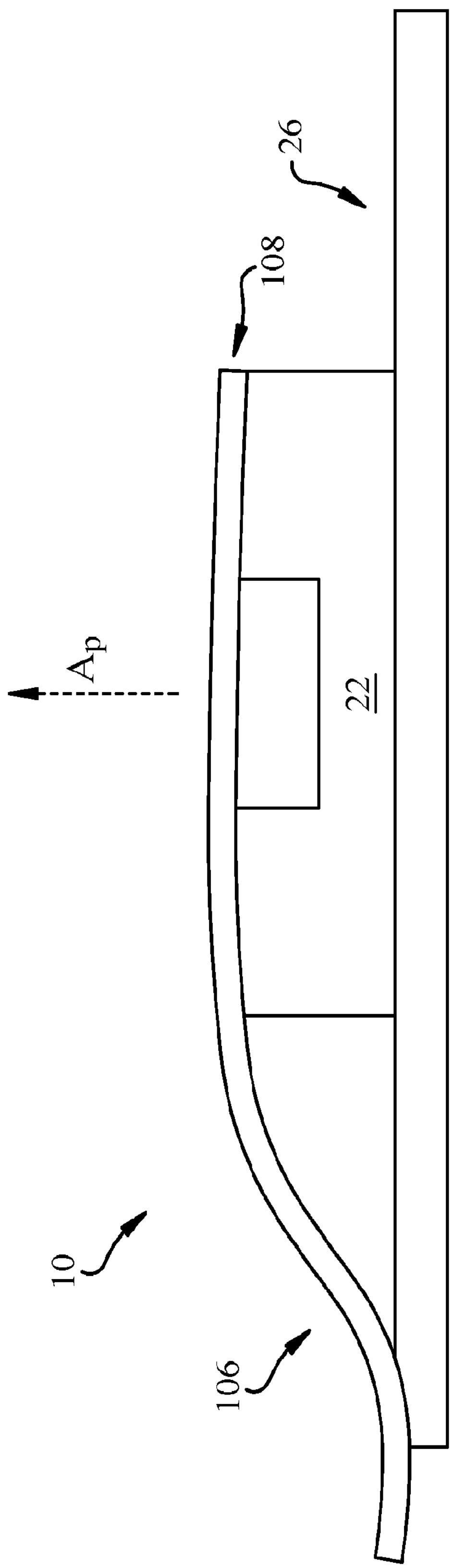
FIG. 10 is a cross-sectional depiction of a portion of an audio device according to various additional implementations.

FIG. 10 is a partial cross-sectional depiction of an additional implementation of an audio device 10, according to various implementations. These implementations can include a top-ported microphone 22, e.g., a microphone 22 mounted between the PWB 26 (or similar printed wiring board, which can include an FPC) and the port (not shown). In these cases, a conductive mesh 106 (or other conductive membrane) is positioned over the upper surface 108 of the microphone 22, which is in contrast to additional disclosed implementations that utilize a conductive mesh (or membrane) mounted to a stiffener above the microphone. In the implementations illustrated in FIG. 10, the mesh 106 can be coupled (e.g., via any mechanism described herein) to the PWB 26 that underlies the microphone 22, and can rest over at least a portion of the upper surface 108 of the microphone. In certain cases, the mesh 106 is fixed to a portion of the microphone housing. In other cases, the mesh 106 is draped over the microphone 22 and fixed only to the PWB 26. In still further implementations, the mesh 106 extends radially across the microphone 22, e.g., from one side of the PWB 26 to the other side of the PWB 26. In various implementations, the mesh 106 is contoured or otherwise includes a contour for at least partially conforming to the shape of the microphone 22 and the PWB 26. In certain of the implementations illustrated in FIG. 10, a stiffener is not used.

Figure 11:
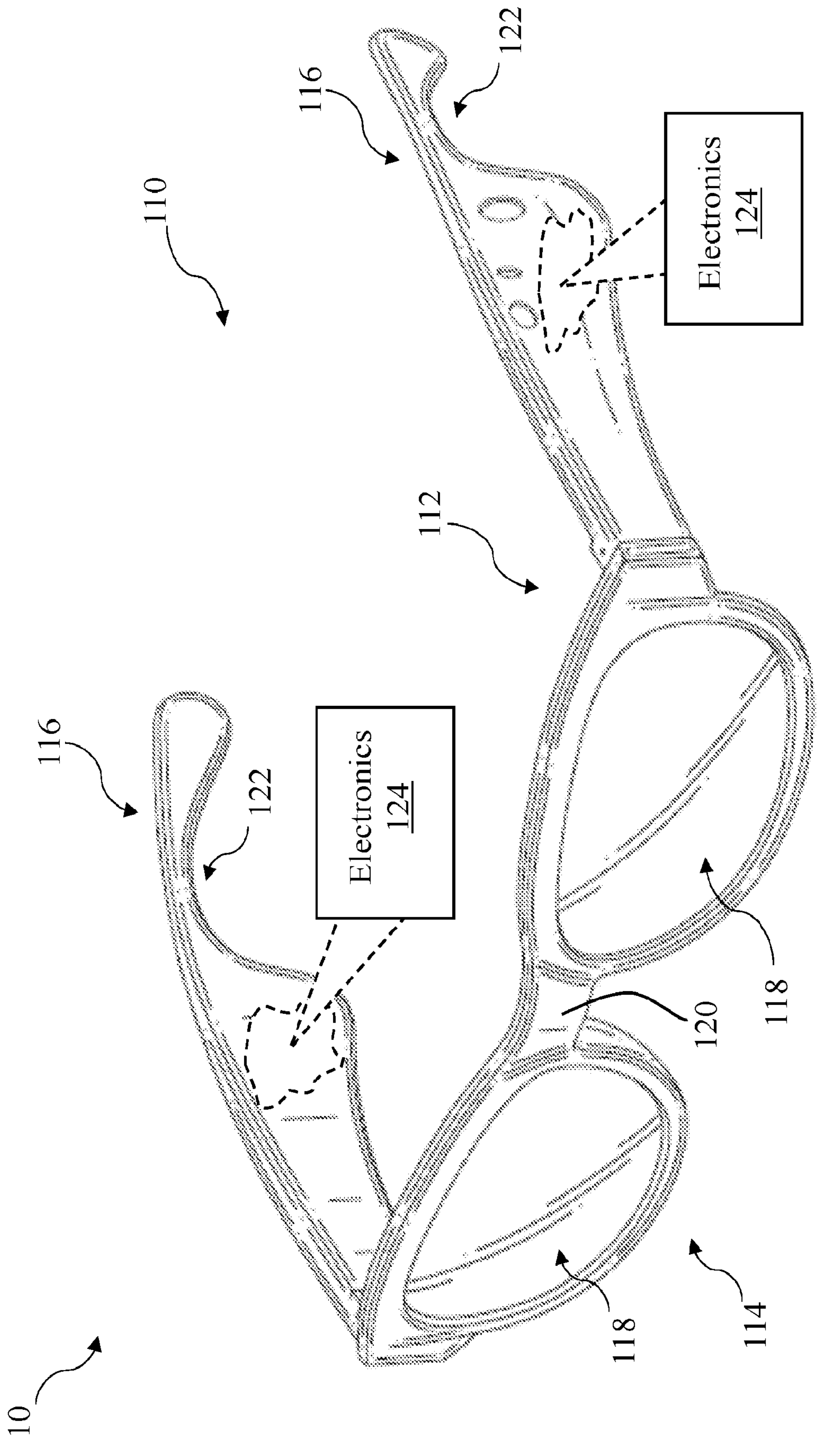
FIG. 11 is a perspective view of an audio device according to various additional implementations.

FIG. 11 shows an additional implementation of an audio device 10, e.g., a wearable audio device. In this example implementation, the wearable audio device (or simply, device) 10 is a pair of audio eyeglasses 110. As shown, the device 10 can include a frame 112 having a first section (e.g., lens section) 114 and at least one additional section (e.g., arm sections) 116 extending from the first section 114. In this example, as with conventional eyeglasses, the first (or, lens) section 114 and additional section(s) (arms) 116 are designed for resting on the head of a user. In this example, the lens section 114 can include a set of lenses 118, which can include prescription, non-prescription and/or light-filtering lenses, as well as a bridge 120 (which may include padding) for resting on the user's nose. Arms 116 can include a contour 122 for resting on the user's respective ears.

Contained within the frame 112 (or substantially contained, such that a component can extend beyond the boundary of the frame) are electronics 124 and other components for controlling the wearable audio device 10 according to particular implementations. In some cases, separate, or duplicate sets of electronics 124 are contained in portions of the frame, e.g., each of the respective arms 116 in the frame 112. However, certain components described herein can also be present in singular form.

Electronics 124 not specifically shown can include one or more electro-acoustic transducer(s) and one or more microphones (e.g., as shown in FIGS. 2-7). Additionally, one or more portions of the frame 112 can include microphone port(s) such as those describe with reference to device 10 in FIGS. 2-7. That is, similar to the audio devices 10 depicted in FIG. 2, in various implementations, the audio eyeglasses shown in FIG. 8 can include: acoustic cavities within the frame 112, an electro-acoustic transducer 20 configured to deliver acoustic energy into the acoustic cavities, and a port integrated into the frame 112 that couples the acoustic cavities. As noted herein, the device 10 can take additional forms and remain in keeping with the various implementations.

In any case, wearable audio devices disclosed according to implementations can include an ESD protection element that aids in diverting ESD strikes away from sensitive device components, e.g., microphones and related acoustic and/or electrical components. When compared with conventional devices and approaches, the disclosed implementations extend the useful life of audio devices and improve acoustic performance. Additionally, the disclosed implementations provide cost-efficient approaches for ESD protection in audio devices, in particular, in small-scale audio devices such as wearable audio devices.

While various implementations described herein refer to wearable audio devices in the form of earphones (e.g., earbuds) and audio eyeglasses, it is understood that the disclosed principles can be equally applied to a number of wearable audio devices in different form factors.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

The invention claimed is:

1. An audio device, comprising:

a microphone mounted on a first side of a printed wiring board (PWB), wherein the PWB comprises a port allowing acoustic energy to pass therethrough for detection by the microphone;

an electrostatic discharge (ESD) protection element coupled to a second side of the PWB directly opposite the microphone, wherein the ESD protection element is positioned to divert an ESD strike away from the microphone; and a stiffener directly coupled with the second side of the PWB, the stiffener comprising an opening that is coaxial with the port, wherein the ESD protection element is coupled with the stiffener on a side opposite the PWB and comprises an electrically conductive mesh overlying the opening in the stiffener, and wherein the stiffener is electrically insulating and comprises a slot exposing a portion of the PWB, wherein the ESD protection element comprises a tab extending from the electrically conductive mesh to contact the exposed portion of the PWB.

2. The audio device of claim 1, wherein the electrically conductive mesh comprises a metal.

3. The audio device of claim 1, wherein the slot in the stiffener and the opening in the stiffener are separated by at least a minimum spacing to divert the ESD strike away from the microphone.

4. The audio device of claim 1, further comprising an adhesive coupling the ESD protection element to the stiffener.

5. The audio device of claim 1, wherein the electrically conductive mesh is electrically coupled with the PWB through the stiffener.

6. The audio device of claim 5, wherein the stiffener is electrically conductive and enables the electrical coupling between the electrically conductive mesh and the PWB.

7. The audio device of claim 1, wherein the audio device comprises an earbud.

8. The audio device of claim 1, wherein the PWB comprises a flexible printed circuit (FPC).

9. The audio device of claim 1, wherein the tab includes an electrical contact between the ESD protection element and the PWB.

10. An audio device, comprising:

a microphone mounted on a first side of a printed wiring board (PWB);

an electrostatic discharge (ESD) protection element coupled to a second side of the PWB directly opposite the microphone, wherein the ESD protection element is positioned to divert an ESD strike away from the microphone; and a stiffener directly coupled with the second side of the PWB, wherein the PWB comprises a port allowing acoustic energy to pass therethrough for detection by the microphone, and wherein the stiffener comprises an opening aligned with the port in the PWB, wherein the opening comprises the ESD protection element and comprises a non-uniform radial dimension relative to a central axis of port.

11. The audio device of claim 10, wherein the non-uniform radial dimension is characterized by a jagged profile.

12. The audio device of claim 10, wherein the opening in the stiffener has an inner radial dimension at all locations that is greater than an inner radial dimension of the port in the PWB.

13. The audio device of claim 10, wherein the stiffener is electrically conductive.

14. The audio device of claim 10, further comprising a mesh overlying the opening in the stiffener, the mesh having a low acoustic resistance.

15. The audio device of claim 10, wherein the non-uniform radial dimension is defined by a profile including at least one portion around the opening located at a distinct distance from the central axis of the port than another portion of the profile around the opening.

16. The audio device of claim 15, wherein the ESD protection element does not interfere with acoustic aspects of the port and the microphone.

17. An audio device, comprising:

a microphone mounted on a first side of a printed wiring board (PWB);

an electrostatic discharge (ESD) protection element coupled to a second side of the PWB directly opposite the microphone, wherein the ESD protection element is positioned to divert an ESD strike away from the microphone; and a stiffener directly coupled with the second side of the PWB, wherein the PWB comprises a port allowing acoustic energy to pass therethrough for detection by the microphone, and wherein the stiffener comprises an opening aligned with the port in the PWB, wherein the ESD protection element comprises a lip extending around the opening in the stiffener.

18. The audio device of claim 17, further comprising a mesh overlying the opening in the stiffener, the mesh having a low acoustic resistance.

19. The audio device of claim 18, wherein the lip protrudes from a rear surface of the stiffener by approximately 0.1 millimeters (mm) to approximately 1.0 mm.

20. The audio device of claim 17, wherein the lip protrudes from the stiffener in a direction away from the microphone.

21. The audio device of claim 20, wherein the lip has a substantially uniform, or smooth, radially facing inner surface relative to a central axis (Ap) of the port.

* * * * *